Patented Aug. 7, 1951

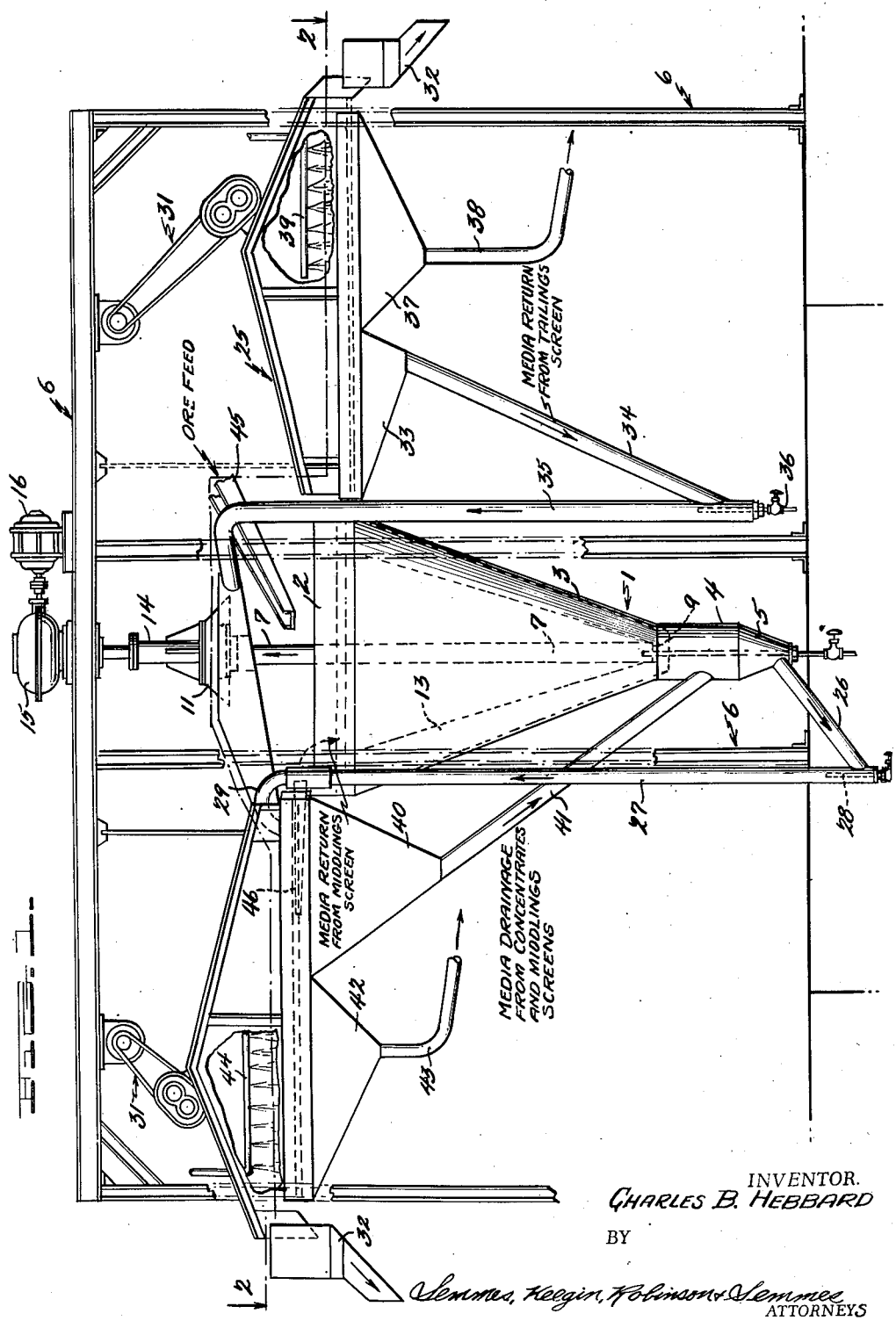

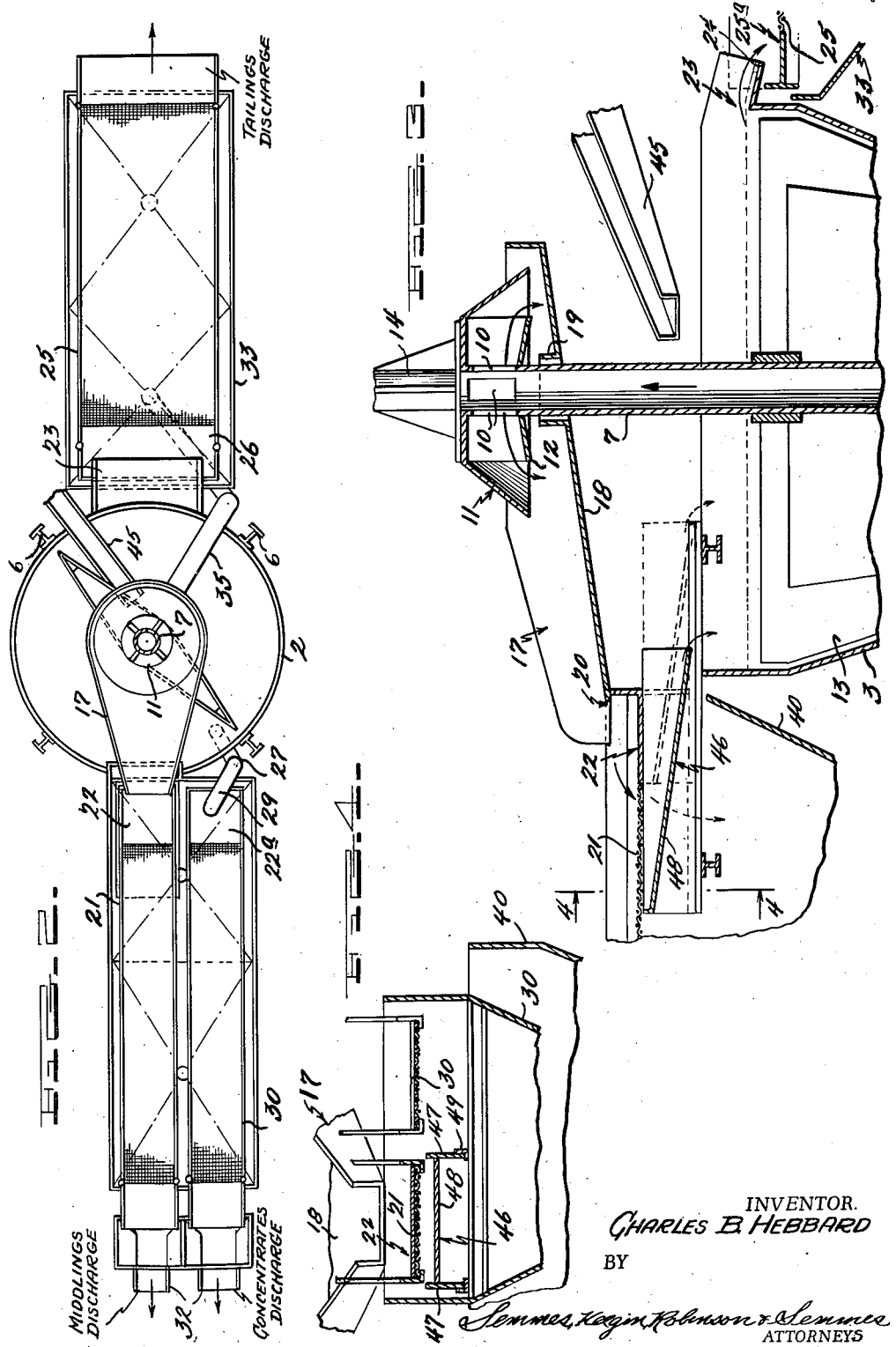

2,563,332

UNITED STATES PATENT OFFICE 2,563,332

APPARATUS FOR MULTIPLE SEPARATION IN HEAVY DENSITY MEDIAE

Charles B. Hebbard, Arlington, Va.

Application May 10, 1949, Serial No. 92,394

4 Claims. (Cl. 209—173)

1

This invention relates to the separation of solids of different densities and is a continuation-in-part of my copending application Serial No. 769,787, filed August 21, 1947, now abandoned, which is a continuation-in-part of Charles B. Hebbard applications Serial Nos. 430,975, filed February 14, 1942, and 554,996, filed September 20, 1944, both now abandoned. More particularly the invention relates to a three-way heavy media separation process and apparatus for separating solid particles according to their specific gravity into concentrates and tailings, and middlings of desired grade.

In general the invention is directed to the separation of fragmental materials to achieve a highly accurate multiple separation of the fragments according to their specific gravities on a commercial scale. It has particular utility in separating the constituents of metallic ores coal and other materials. The separation process is carried out in heavy supporting media having a specific gravity lying between that of the heaviest density and the lightest density material to be separated. In the present invention the heavy media is of the type consisting of comminuted heavy solid having different particle size and suspended in a liquid.

Sink and float separation is well known and in the process, as usually carried out, the fragmentary material to be separated is fed into a more or less quiescent pool or column of the separation media, usually in a conical tank called a cone. The particles of lighter density than the media (tailings) float at or near the top of the column and the particles of heavier density than the media (concentrates) sink to the bottom or near the bottom of the column. The float material is continuously removed from the top of the column while the sink material is removed from the bottom of the column. In practice, some of the media is also removed with both the sink and float material, and means are provided to return this media to the cone usually with additional media to maintain a desired level to permit overflow for float removal and also to maintain the desired specific gravity of the media in the cone. Middlings, or material particles having approximately the same specific gravity as the media tend to remain suspended in the media, and it has been also proposed to remove these middlings as a separate separation product. One method of doing this is by means of an air lift column rising centrally through the cone from a point somewhat above the bottom of the cone to above the medium level.

2

As disclosed in my application Serial No. 769,787 above mentioned, I have found that by controlling the specific gravity of the media, particularly in the region of the air lift inlet, and/or the velocity of a rising current of the media adjacent the bottom of the tank, an accurate classification of the sink material can be obtained whereby middlings of a desired richness (lower specific gravity) may be separated from the concentrates (higher specific gravity) and may be separately removed.

The use of heavy media consisting of liquid and comminuted solids in ore separation processes is known and has been used heretofore where it was desired to obtain a gradually increasing or differential specific gravity of the media column from the top to the bottom of the separating tank. Rakowsky et al. Patent No. 2,176,189 discloses such a system. When attempts were made, however, for continuous operation in larger sizes of separating cones (10-25 feet deep) it was found that ore particles having a specific gravity between the upper and lower specific gravities of the media column would build up and form a horizontal bed near the middle of the cone. When this bed formed settling of concentrates to the bottom of the cone was prevented, and operation had to be halted until the middlings bed could be broken up.

It has been determined that differential specific gravity in a heavy media column occurs because of the different settling rates of the different particle sizes of the solid constituent of the media. This is shown when, after a short period of operation, the solid grains appear to stratify, separating themselves according to size into horizontal layers or beds of gradually increasing specific gravity with depth in the cone. I have discovered that by mixing the media withdrawn and drained from the tailings and that withdrawn through the middlings air lift and drained from the middlings and returning this mixture to the top of the cone, a uniform apparent density from top to the bottom of the cone could be obtained, the above mentioned bed of middle gravity ore was prevented, and continuous operation could be maintained.

From here on in this application the term "density" is applied to the material to be separated (ore) and is to be used in the same sense as specific gravity. The term "apparent density" refers to lifting effect of the media which depends not only upon specific gravity but partly also upon the rising velocity of the media pool and the viscosity of the media, the viscosity, in a measure, depending on the particle size of the solid constituent of the media.

In addition I have discovered that advantage may be taken of the different settling rates of the solid constituent of heavy media to obtain a very accurate classification. This is accomplished by returning the media removed with and drained from the concentrates together with a controlled percentage of the removed media drained from the middlings to the bottom of the cone, the remainder of the media drained from the middlings and that drained from the tailings being returned to the top of the cone as aforementioned. By means of this method of media return, a uniform media apparent density is maintained downwardly to the vicinity of the middlings air lift and a controlled but increased apparent density from the point of concentrates discharge to the vicinity of the middlings is obtained. Concentrates and middlings settle to the lower region of the cone where middlings of a desired density will teeter in the region of the middlings air lift to be removed thereby, and concentrates or concentrates with middlings or concentrates with middlings of a desired density will continue to sink to the concentrate discharge. By thus controlling the rising velocity of the media at the entrance to the middlings air lift, a very accurate classification of the middlings can be obtained.

Also by regulating the amount of air used in the middlings air lift the rising velocity of the media in the air lift can be regulated between the settling rates of middlings and concentrates in said media. For example, if the rising velocity of media in this air lift is regulated to a rate higher than the sinking rate of the desired middlings, they will be carried up and out of the air lift discharge. The concentrates, of higher specific gravity than the middlings and therefore faster settling rate than the rising velocity of the media in the air lift will not be elevated with the middlings, but will drop back and sink into the lower cylindrical section and be removed by the outside air lift. By regulation of the air valve, the rising velocity of media in the air lift can be controlled to produce the desired grade of middlings and concentrates.

It is an object of this invention, therefore, to provide a heavy media separation process and apparatus in which the media circulation is controlled to obtain a desired rising velocity sufficient to obtain desired middlings classification of material.

With the above and other important objects and advantages in view, which will become more apparent during the course of the following description, the invention consists in the parts and combinations and in the procedural steps hereinafter set forth with the understanding that various changes may be made therein by those skilled in the art without departing from the spirit of the invention.

In order to make the invention more clearly understood, a preferred apparatus for carrying the same into practical effect has been made the subject of illustration in the accompanying drawings in which:

Figure 1 is a view in elevation of an ore separation apparatus according to the invention;

Figure 2 is a horizontal sectional view taken along the line 2—2 of Figure 1;

Figure 3 is fragmental transverse sectional view taken along the line 3—3 of Figure 2; and Figure 4 is a sectional view taken along the line 4—4 of Figure 2.

Referring more particularly to the drawings, there is shown a conical separation tank 1 having an upper cylindrical section 2 from which depends an inverted conical section 3 which terminates in a reduced cylindrical section 4 closed at its bottom by a conical section 5. The tank 1 is supported in a vertical position by a framework indicated generally as 6. Rising axially in the tank 1, from a point adjacent the juncture of the conical section 3 with the lower cylindrical section 4 to a point above the upper rim of the tank is a tube 7 which constitutes a middlings air lift. The tube 7 is provided with a valve controlled air pipe 8 which enters the tank axially through the bottom cone section 5 and extends a short distance upwardly into the lower end 9 of the tube 7.

The lower end of the tube 7 is open and communicates with the reduced cylindrical section 4, the wall of the tube 7 being spaced from the wall of the cylindrical section 4. The upper end of the tube 7 is provided with a circular series of radial openings 10 which open into a baffle indicated generally as 11 and which has a circular bottom wall 12.

The tube 7 is rotatably supported and carries, within the tank 1, the usual scrapers 13 for preventing the adherence of accumulated solids on the wall of the tank. The upper extremity of the tube 7, above the openings 10, is closed and connected with an upward extension 14 which is, in turn, coupled through a speed reducer 15 with an electric motor 16 by means of which slow rotation may be imparted to the tube and scrapers 13.

Below the baffle wall 12 is positioned a middlings launder 17 having an inclined bottom 18. The launder 17 surrounds the tube 7 which passes through an upstanding collar 19 formed on the bottom wall. The launder 17 forms a discharge chute 20 which extends beyond the periphery of the upper section 2 of the tank 1 and over the end of a middlings drainage screen 21. A wear plate 22 is positioned under the lip of the middlings discharge chute 20.

The upper cylindrical section 2 of the tank 1 is formed with an overflow weir 23 provided with a lip 24 which extends over the end of a tailings drainage screen 25. A wear plate 25a is also positioned under the lip 24.

Communicating with the lower end of the bottom cone 5 of the tank 1 is a downwardly inclined, concentrates discharged pipe 26 which connects with the lower end of an upwardly extending concentrate air lift 27 having a valve controlled air pipe 28 extending a short distance upwardly into its lower end. The upper end of the air lift 27 terminates in a goose neck discharge 29 which opens over one end of a concentrates drainage screen 30. The concentrates screen 30 preferably lies adjacent the middlings screen 21, parallel therewith and in the same horizontal plane therewith. A wear plate 22ᵃ is positioned under the goose neck 29.

Each of the screens 21, 25 and 30 is of the shaker type adapted to move material from one to the opposite end thereof while draining off the media removed from the tank with the material as will be further set forth. These screens are suspended from overhead rails of the framework 6 and are actuated by shaker mechanisms indicated generally as 31. The said opposite or discharge ends of the screens each respectively overlie a chute 32 which discharges onto a suitable conveyor (not shown) for moving the drained material to storage, waste or further processing as the case may be.

Underlying approximately half the length of the tailings drainage screen 25 adjacent the overflow launder 23 is a collecting hopper 33, the bottom walls of which converge to the upper end of a downwardly inclined pipe 34, the lower end of which communicates with the lower end of an air lift tube 35 having a valve controlled air pipe 36 extending upwardly into its lower end. The upper end of the air lift tube 35 discharges into the middlings launder 17. The purpose of the hopper 33, pipe 34 and air lift 35 is to return the media overflowing with the tailings back to the separation tank as will be further described.

A second hopper 37, in end to end abutting relation to the hopper 33 underlies the remaining length of the screen 25 and its bottom walls converge to a pipe 38. The hopper 37 collects washings from the tailings as they are moved by the screen 25 under water sprays 39 which wash the remaining media adhering thereto and which fails to drain off of its own accord. This wash water drainage with its contained media is removed through the hopper 37 and pipe 38 to a thickening apparatus (not shown) from which it may be returned as "make-up" media for the separation tank.

Underlying approximately half the length of both the middlings drainage screen 21 and the concentrates drainage screen 30 lying adjacent the tank 1 is a hopper 40, the bottom walls of which converge to the upper end of a downwardly inclined pipe 41, the lower end of which communicates with the reduced cylindrical section 4 of the separation tank 1 about or preferably just below the lower or entrance end of the middlings air lift tube 7. This is for returning to the bottom of the separation tank the media removed from the material and drained therefrom as the material is moved over the forward portions of the screens 21 and 30.

A hopper 42 in end to end abutting relation to the hopper 40 underlies the remaining length of the screens 21 and 30 and has its lower walls converging to the inlet end of a pipe 43. The hopper 42 collects washings from the concentrates and middlings as they are moved over the screens under washing sprays 44 which wash off the media remaining on the material after it has passed over the hopper 40. This wash water and media drainage is conveyed by the pipe 43 to a thickening apparatus (not shown) from which the thickened media may be returned as make up media.

The material to be separated is fed in fragmental form, usually together with make up media, to maintain an overflow level in the tank, onto the surface of a pool of the separating media in the tank 1 through a feed launder 45. The fragments having a specific gravity less than the apparent density of the media float on or near the surface of the pool and the fragments having a specific gravity greater than the apparent density of the media settling to the bottom of the tank. As material is added to the pool, the tank overflows the weir 23 and carries the float material or tailings and some of the top media onto the screen 25 where the media is drained off, the tailings are washed, and then discharged over the end of the screen. The sink material settles through the media and that having a specific gravity higher than the apparent density of the media, or concentrates, settles to the bottom of the cone 5 where it is drawn off with some of the bottom media through the pipe 26 and air lift 27 and is discharged onto the screen 30 through the goose neck 29. Here the media is drained off, the concentrates are washed and discharged over the end of the screen 25. Middlings, or sink material having a specific gravity approximating that of the apparent density of the media, will remain more or less in suspension in the lower part of the tank and be drawn into the central air lift 7 from which they will be discharged with some of the media onto the launder 17 and thence onto the screen 21. Here the media will be drained off, the middlings washed and discharged over the end of the screen 21.

In accordance with the present invention the media consists of the suspension of a comminuted, heavy solid or solids in water. Various solids which are insoluble in water, such as ferro silicon, galena, magnetite, etc., and which when ground to a certain particle size will remain more or less suspended in the liquid, have been used to make up heavy media. The period of suspension will vary with the particle size—particles approaching colloidal will remain in suspension almost indefinitely while the larger particles will more quickly settle in a static pool, the settling rate depending largely upon the particle size. As previously mentioned, use has been made of this differential settling rate to obtain a pool in which the specific gravity of the media increases continuously from top to bottom. In accordance with this invention, however, I prefer to maintain the main body of the pool, at least down to the region of the central air lift, at a uniform apparent density.

It might be mentioned here that where the term "density" is applied to the material to be separated (ore), it is used in the same sense as specific gravity. "Density" of the media, refers to the "apparent density" or lifting effect of the media which depends not only upon specific gravity but partly also upon the rising velocity of the media pool and the viscosity of the media, the viscosity depending, in a measure, on the particle size of the solid constituent of the media.

I propose to maintain a uniform apparent density of the media in the main upper region of the pool or cone section 3 to provide free settling of material to the lower region, and a somewhat increased apparent density in the lower region or reduced cylindrical section 4. I accomplish this by controlling the return to the pool of the removed and drained off media.

Since because of the different settling rates of the solid medium, the specific gravity of the media pool tends to increase from top to bottom, it will be understood that if the media removed with the material from the lower region of the pool is continuously returned to the top of the pool, a substantially uniform apparent density from top to the bottom of the pool may be maintained. It will also be understood that if the dense media removed from the very bottom of the pool with the concentrates is returned to the bottom and the remainder which is removed with the middlings and tailings is returned to the top of the pool, a uniform apparent density may be maintained in the main cone section 3 and a higher apparent density maintained in the lower cylindrical section 4. By controlling the viscosity, and to a certain degree the rising velocity, of the media in the bottom of the tank by returning a controlled amount of the media removed with the tailings and middlings to the bottom of the tank together with that removed with the concentrates, a desired rising velocity in the cylindrical section 4 and adjacent the entrance of the air lift 7 can be obtained and a desired middlings classification obtained since middlings of a desired specific gravity will be teetered adjacent the entrance of the central air lift 7 and sucked up by the air lift.

In addition to the above I may return all removed media to the bottom of the tank to circulate upwardly. In this way I am not only able to obtain a uniform apparent density in the main body of the pool because of the expanded cone 3, but also a somewhat increased apparent density in the bottom region of the pool because of the reduced cross section of the cylindrical section 4. While the classification of the material separated in the lower region of the pool will not be as accurate as with the first method of media apparent density control, this last method will be found suitable for "free milling" ores where classification is not so critical. The first method, on the other hand, will be found more adaptable where delicate separation of ore having slight differences in gravity between the two products separated is desirable.

A preferred means for effecting the above control of media return is shown best in Figures 3 and 4. This comprises essentially a movable baffle 46 below the screen 21 and under the discharge lip of the launder 17. The baffle 46 is in the form of a trough having side walls 47 and an inclined bottom 48. It is mounted for longitudinal movement so as to be extended or retracted relatively to the lip of the launder 17 on parallel rails 49 which extend between the tank 1 and the hopper 40. Suitable manually operable means, such as a lead screw or rack and pinion (not shown) may be provided for moving the baffle. As seen in Figure 3, the bottom of the baffle 46 slopes downwardly from the screen 21 toward the tank 1 so that media falling on the baffle will flow into the tank. It will be seen also that the baffle may be adjusted from a fully extended position, shown in full lines, where it will catch all of the media draining through the screen 21, return it to the top of the tank 1, to a fully retracted position where all of the media draining the screen 21 will drop into the hopper 40 and flow thence down the pipe 41 into the lower cylindrical section of the hopper. In intermediately adjusted positions, the media draining through the screens will be divided according to the position of the baffle relatively to the lip of the launder, a portion being returned to the top of the tank 1 and the remainder being returned to the lower cylindrical section 4.

As will be seen in Figures 1 and 2, the media which is removed from the tank with the tailings and which drains through the screen 25 will flow down the pipe 34 into the air lift 35 and thence onto the launder 17 from which it flows onto the screen 21 and, depending upon the adjustment of the baffle 46, will be returned to the top and/or bottom of the tank as aforesaid together with the media removed from the tank with the middlings through the center air lift 7. All of the media removed from the bottom of the tank with the concentrates through the pipe 26 and air lift 27, on the other hand, is drained through the screen 30 into the hopper 40 and returned through the pipe 41 to the lower cylindrical section 4 of the tank.

It will be seen, therefore, that all of the bottom media having a higher specific gravity (solid medium having the larger particle size) will be returned to the bottom of the tank and more or less of the media having intermediate specific gravity (intermediate solid particle size) may be returned to the bottom with the larger particles according to the adjustment of the baffle 46, and a controlled desired specific gravity of the medium in the cylindrical section adjacent the intake of the air lift 7 obtained. The remainder of the media withdrawn over the weir 23 and through the central air lift 7 and which contains the small and intermediate particles of the solids is being retraced back onto the surface of the pool and although the larger of these particles settle, they are continuously brought back to the surface and a substantially uniform apparent density of the media from the surface of the pool down to adjacent the entrance of the central air lift is maintained. Thus the sinking ore fragments freely settle in the conical section 3 of the tank until they reach the lower cylindrical section 4 where the specific gravity of the media is higher. Here the ore fragments having a higher settling rate in the media continue to sink and are drawn into the air lift 27 while those having a slow settling rate equal to or more than that of the media in the section 4 teeter or lie suspended in the region of the entrance to the air lift 7 and are sucked up onto the launder 17. It will be obvious, therefore, that by controlling the rising velocity of the media in the section 4, a very accurate classification of the sink material can be obtained.

The media with the waste drainage from the hoppers 37 and 42 is thickened to correct gravity and returned as make up with the feed as in usual practice.

When all of the media drained from the withdrawn tailings middlings and concentrates is returned to the bottom of the media pool, it is mixed in the hopper 40 and returned to the lower cylindrical section through the pipe 41. Thus an upward circulation of the media is effected at uniform specific gravity from the entrance of the pipe 41 into the section 4 to the surface of the pool. This returned material creates a rising velocity which diminishes as the pool expands in the conical section 3. This higher rising velocity in the upper portion of the cylindrical section 4 and apex of the conical section 3 creates an increased apparent density in the region of the entrance to the central air lift which hinders settling of the middlings in this region and permits them to be sucked into the central air lift. As stated, the classification in the lower cylinder 4 is not as fine in this case as in the operation described in the immediately preceding, but is sufficient for use in the separation of free milling ores.

Some concentrates and heavier middlings may be drawn into the air lift column 7 with the lighter middlings. Air bubbles rising in the column 7 expand as they rise, bringing about an upwardly decreasing apparent density in the air lift column. Such concentrates and heavier middlings which are drawn into the air lift column 7, therefore, will separate from the lighter middlings in the column and drop downwardly, due to their falling velocity, through the lower end of the tube 7 and lower cylindrical section 4 of the tank and will be discharged from the bottom of the tank.

I claim:

1. A tank for the purpose described having an upper expanding tubular portion and a lower smaller tubular portion forming an extension of the upper portion with means for feeding a heavy density fluid medium consisting of finely divided solids and water into the lower portion so as to flow upward therein, and an air lift conduit having its inlet and located in the center of the upper portion of the tank at a point immediately above the junction of the lower portion and the upper portion, said conduit extending to a level above the top of the tank, and a second air lift conduit having its inlet in communication with the bottom of said lower portion of the tank and extending to a level above the top of the tank and means for feeding material into the top of the tank, means for removing floating material from the top of the tank and means for injecting air into said air lift conduits.

2. A tank for the purpose described having an upper conical portion and a lower extension portion, with means for feeding a heavy density fluid medium consisting of finely divided solids and water into the lower extension portion so as to flow upward therein, and an air lift conduit having its inlet end located in the center of the conical portion of the tank at a point immediately above the junction of the extension portion and the conical portion, said conduit extending to a level above the top of the tank, and a second air lift conduit having its inlet in communication with the bottom of said lower extension portion of the tank and extending to a level above the top of the tank and means for feeding material into the top of the tank, means for removing floating material from the top of the tank and means for injecting air into said air lift conduits.

3. In an apparatus for separating materials of different density in a high density medium, a separation vessel of the shape of an inverted cone having a wide top portion with an overflow spout and a narrow tubular bottom portion, said vessel being adapted for containing said density medium, of finely comminuted solids, of less density than some of said material, means for feeding said medium with fragmented solids for separation into the top portion of the vessel where the lighter material as tailings will be immediately discharged through said spout, divided screens for separated material above said vessel top, launder means adapted for discharging onto said screen, a main air lift column extending axially in said vessel with its upper end opening into said launder and its lower end opening adjacent the tubular bottom portion of the vessel, a central airlift jet for creating an upward stream of air bubbles and medium through said column entering slightly above the bottom end of said column, a hopper below said divided screens, a return conduit from the hopper to said tubular bottom portion, and a secondary airlift column positioned exteriorly to said vessel and forming a conduit from said tubular bottom portion to the top of said screens, whereby due to the increasing size of the air bubbles as they rise within the main air lift column, the denser material being elevated receives less support than the lighter material and therefore drops back and out of the bottom open end of the air lift column, thereby effecting a separation from the lighter material which is carried out upward.

4. In an apparatus for separating materials of different density, in a column of medium and air bubbles, a separation vessel in the shape of an inverted cone with a wide top having an outlet for tailings and a smaller bottom portion, said vessel being adapted to contain a medium of finely comminuted solids of lesser density than a part of said material, means for feeding said fragmentary material into the top of the vessel, a launder for receiving part of the separated material above said vessel, a twin screened hopper below the launder, an air lifting column open at both ends suspended from said launder and extending axially in said vessel down to within a short distance above said smaller bottom portion, and means for creating an upward stream of medium and air through said column, said air entering slightly above the bottom end of said column, a return conduit from said hopper for the screened medium to the said smaller bottom portion of the vessel, a vertical pipe outside of said vessel connecting with the lowermost point of said bottom portion of said vessel and terminating at its upper end with a goose neck adapted for discharging said mixture of medium and concentrates onto one of said screens, and other means at the lower end of said pipe for creating an upward stream of air bubbles in said pipe, whereby the denser fragments will sink to the bottom, and the rising air bubbles gradually increasing in size and mingling with said medium in said air lift column will cause a separation of said fragments within said air lift, elevating the lighter fragments of said material to be disposed of on one of said screens and the heavier fragments sinking from the mixture in the air lift column to be elevated in said vertical outside pipe to said concentrate screen and collected therefrom.

CHARLES B. HEBBARD.

REFERENCES CITED

The following references are of record in the file of this patent:

UNITED STATES PATENTS

| Number | Name | Date |
|---|---|---|
| 751,645 | Hopkins | Feb. 9, 1904 |
| 1,392,400 | Chance | Oct. 4, 1921 |
| 1,545,636 | Chance | July 14, 1925 |
| 1,729,545 | Marchant | Sept. 24, 1929 |
| 2,139,047 | Tromp | Dec. 6, 1938 |
| 2,176,189 | Rakowsky | Oct. 17, 1939 |
| 2,190,637 | Rakowsky | Feb. 13, 1940 |
| 2,206,980 | Wade | July 9, 1940 |
| 2,304,352 | Griffiths | Dec. 8, 1942 |
| 2,347,246 | Holt | Apr. 25, 1944 |
| 2,365,734 | Tromp | Dec. 26, 1944 |
| 2,379,184 | Rakowsky | June 26, 1945 |
| 2,474,774 | Bean | June 28, 1949 |

FOREIGN PATENTS

| Number | Country | Date |
|---|---|---|
| 184,237 | Great Britain | July 31, 1922 |
| 210,663 | Great Britain | Feb. 27, 1924 |
| 465,126 | Great Britain | Apr. 30, 1937 |
| 496,538 | Great Britain | Dec. 2, 1938 |
| 523,429 | Great Britain | July 15, 1940 |

OTHER REFERENCES

The Colliery Guardian, November 24, 1939, pages 748, 749, 750.